(12) United States Patent
Tsai et al.

(10) Patent No.: US 10,867,215 B2
(45) Date of Patent: Dec. 15, 2020

(54) MIXED INTELLIGENCE DATA LABELING SYSTEM FOR MACHINE LEARNING

(71) Applicant: Black Sesame International Holding Limited, Santa Clara, CA (US)

(72) Inventors: Mengting Tsai, Cupertino, CA (US); Guan Wang, San Jose, CA (US); Hao Du, Campbell, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 64 days.

(21) Appl. No.: 16/381,843

(22) Filed: Apr. 11, 2019

(65) Prior Publication Data
US 2020/0327374 A1 Oct. 15, 2020

(51) Int. Cl.
*G06K 9/00* (2006.01)
*G06K 9/62* (2006.01)

(52) U.S. Cl.
CPC ......... *G06K 9/6259* (2013.01); *G06K 9/6215* (2013.01); *G06K 9/6264* (2013.01)

(58) Field of Classification Search
CPC ... G06K 9/6259; G06K 9/6215; G06K 9/6264
See application file for complete search history.

(56) References Cited

U.S. PATENT DOCUMENTS

| | | | |
|---|---|---|---|
| 2019/0065908 A1* | 2/2019 | Lee | G06K 9/4604 |
| 2020/0202210 A1* | 6/2020 | Kushnir | G06N 3/08 |
| 2020/0210780 A1* | 7/2020 | Torres | G06F 16/783 |

* cited by examiner

*Primary Examiner* — Ping Y Hsieh
(74) *Attorney, Agent, or Firm* — Timothy T. Wang; Ni, Wang & Massand, PLLC

(57) ABSTRACT

A method of hybrid data labeling for machine learning, including receiving multiple unlabeled objects forming an unlabeled data set, pre-labeling the unlabeled data set by a machine learning system to output a pending label data pool, bifurcating the pending label data pool by the machine learning system into high and low confidence sets, dispatching the high confidence set to a machine labeler, dispatching the low confidence set to a human labeler, merging the label sets to return a pre-review label data pool, determining a difference between the pending label data pool and the pre-review label data pool, review labeling the data objects, if the determined difference of the data objects is greater than a predefined error threshold and storing the data objects to a reviewed pool if the determined difference of the data objects is less than and equal to the predefined error threshold.

11 Claims, 4 Drawing Sheets

MIXED INTELLIGENCE DATA LABELING SYSTEM FOR MACHINE LEARNING

BACKGROUND

Technical Field

The instant disclosure is related to convolutional neural networks and specifically improving the efficiency of data labeling.

Background

As a child learns to speak being taught by a parent pointing to a picture and telling the child what the image is called, a neural net also needs to be taught. With the child, the picture is the element and the word below the picture is the label. At some point a child is able to recognize a banana whether it is yellow or green, in the same way; a neural net is able at some point to recognize that same banana whether it is yellow or green and subsequently labels future pictures of bananas as bananas. It is necessary to be careful in the initial teaching stage so that the child does not get confused, showing only the banana, not a banana in the hand of a chimpanzee. In the same way, a neural net accuracy is also affected by initial training and tightly controlling the training box to show all of the banana, but only the banana. This balance between parental (human) training and self-labeling (machine pre-labeling) can be complex and needs to be tightly managed.

Analogously, labeling is the first stage of data preprocessing in supervised learning. The preprocessing of data may be performed by a machine pre-labeler and or a human labeler. It is necessary for human labelers to be careful due to the fact that mistakes and inaccuracy affects in a negative way a dataset quality, which then affects the accuracy of a predictive model. One method of data labeling is semi-supervised learning of labeled and unlabeled data.

A method is sought to efficiently manage mixed intelligence labeling for neural networks.

SUMMARY

An example method of hybrid data labeling for machine learning, including at least one of receiving a plurality of data objects that are unlabeled, wherein the unlabeled data objects form an unlabeled data set, pre-labeling the unlabeled data set by a machine learning system to output a pending label data pool, bifurcating the pending label data pool by the machine learning system into a high confidence set and a low confidence set, dispatching the high confidence set to a machine labeler to return a machine labeled set, dispatching the low confidence set to at least one human labeler to return a human defined label set, merging the machine labeled set and the human defined label set to return a pre-review label data pool, determining a difference between the pending label data pool and the pre-review label data pool, review labeling of the at least one of the plurality of data objects, if the determined difference of at least one of the plurality of data objects is greater than a predefined error threshold and storing the at least one of the plurality of data objects to a reviewed pool if the determined difference of at least one of the plurality of data objects is at least one of less than and equal to the predefined error threshold.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
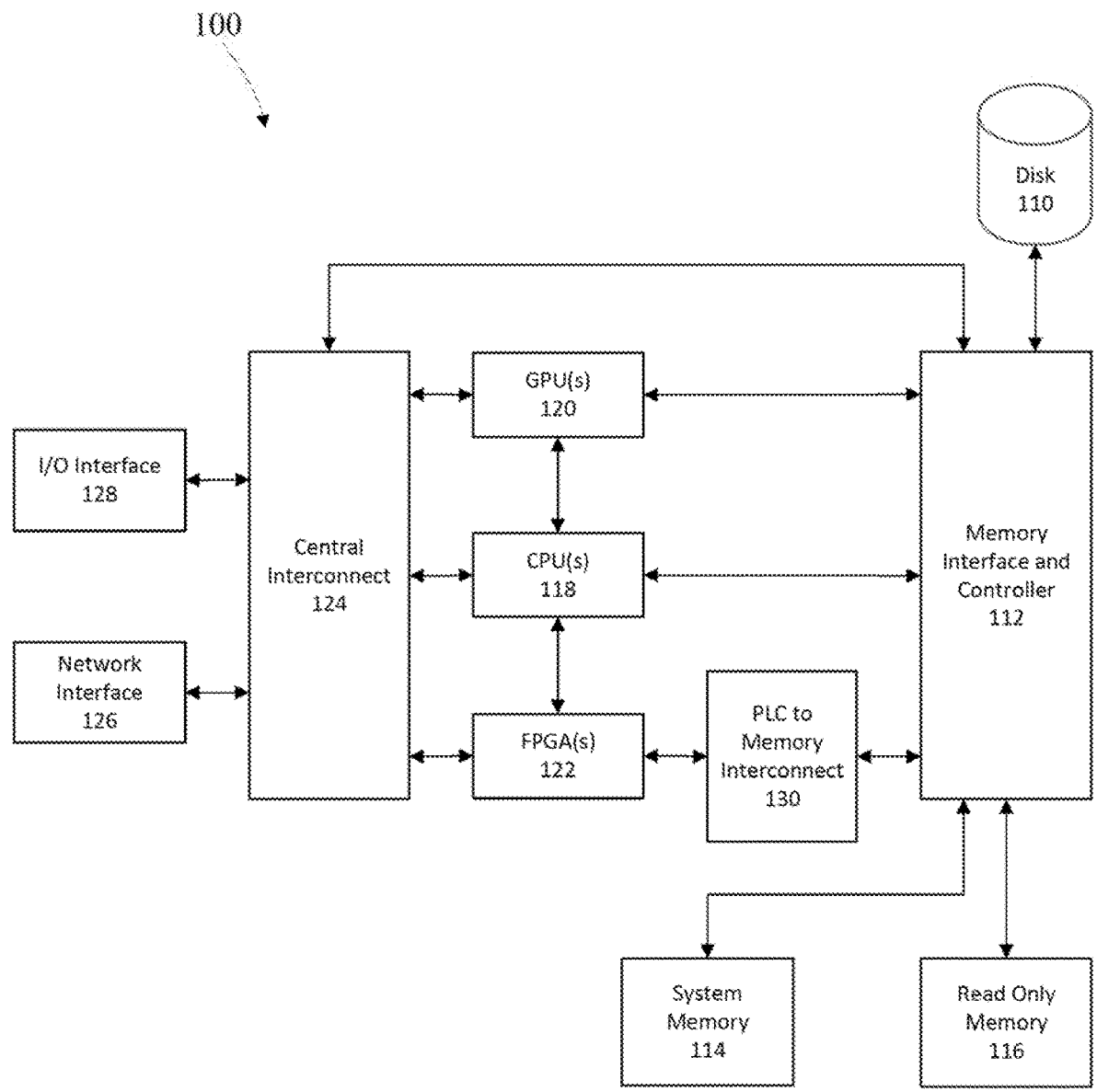
FIG. 1 is a first example system diagram in accordance with one embodiment of the disclosure.

FIG. 1 depicts an example hybrid computational system 100 that may be used to implement neural nets associated with the operation of one or more portions or steps of processes 300 and 400. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
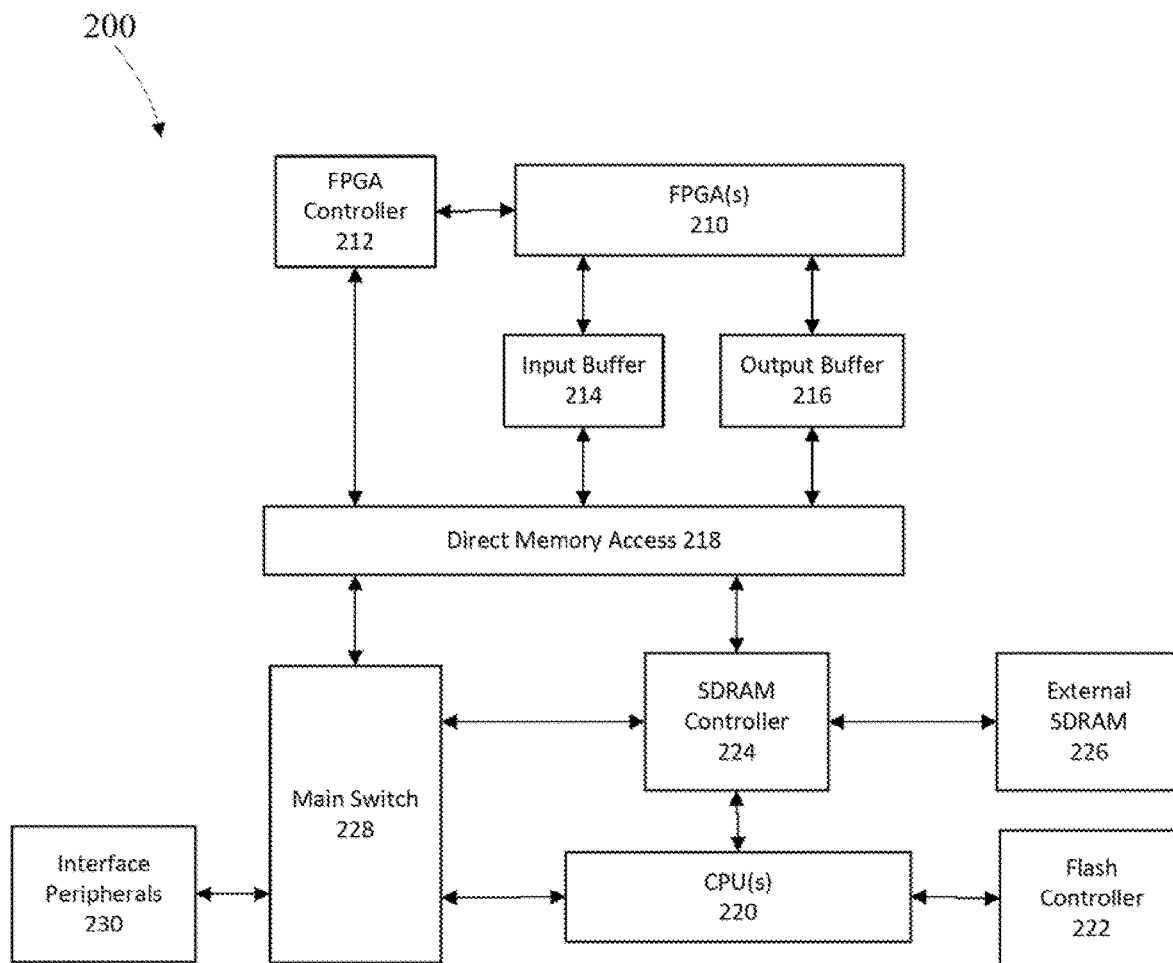
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

FIG. 2 depicts a second example hybrid computational system 200 that may be used to implement neural nets associated with the operation of one or more portions or steps of process 600. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Machine learning systems and their applications have grown in use in recent years. Many machine learning systems and applications rely on supervised learning, which means the training data has to be labeled. The labeling tasks vary from algorithm to algorithm, some describe the meaning of a paragraph of natural language, some describe objects in an image, or draw bounding boxes and the like. Some effective machine learning algorithms, such as deep learning, often require millions of labeled data object to function properly. Therefore, labeling training data is often important for machine learning systems and applications and a labor intensive job for humans. The quality of the labeled data may be a deciding factor for the machine learning system to function properly.

Many different data labeling platforms are available typically relying on the hiring of personnel to label customer defined data and then sell the results to application providers.

In such platforms, human labor is leveraged throughout the process of data selection, cleaning, labeling, and result review and delivery.

There exists some automation to assist personnel to finish the job via web based portals. However, the backend intelligence of efficiently utilizing human labor and simultaneously training machine labelers is absent. Backend intelligence is defined as looping pre-trained machine learning so that the system understands the data, dispatching the data to multiple human workers and machine labelers, gathering the results, automatically reviewing them, and providing feedback to the human workers, while utilizing the labeled data to train the machine labeler, and self-managing the entire loop.

In this disclosure, a backend intelligence system is depicted to manage data collection and labeling. The mixed-intelligence data labeling system has several components that work collaboratively to address, leveraging pre-trained machine learning models to understand the raw, unlabeled data, and pre-label the objects, leveraging an intelligent data dispatching system to distill human knowledge about the labeling tasks while minimizing human involvement for data management and quality inspection and leveraging the labeled data for re-training of the pre-trained machine learning models to increase their accuracy in understanding and labeling the data.

The disclosed system more efficiently utilizes human labor involvement by having the system perform self-checks and self-correction.

Traditionally, human labor has been involved in all phases of the labeling. For example, when a customer provided a dataset, such as images to label, human labelers would review the majority of the images to determine their quality. Many human labelers review every image and notate their labels, while others review every label that others wrote and make corrections. The traditional process was human labor centric, human labor intensive and error prone.

In the disclosed system and method, a significant portion of the process is performed by pre-trained machine learning models. Human involvement is utilized to maintain core efficiencies, so that the labeling procedure is performed faster and more efficiently than traditional labeling.

The system is differentiable, which means it has the ability to learn from its errors and adjust human involvement to maintain accurate label generation with respect to the different labeling tasks.

Human labor primarily impacts three components: pre-labeling data inspection, labeling, and results review. Traditional platforms utilize dedicated personnel or crowd-source freelancers to perform tasks within these components. When the quality expectation is not met, increased human review and re-labeling is the net result.

In the disclosed system and method, if the quality expectation is not met, the labor from human reviewers is increased; the system will receive feedback and increase the portion of human labelers versus machine labeling. This quality check results in a higher accuracy label and improves the pre-trained models. The improvement in the pre-trained model will in turn generate higher quality labels. Furthermore, when human labeling is not needed to increase the quality, it may be redirected to other priority tasks. This judicious use of human labor increases the efficiency of the system and lowers the customer cost.

Figure 3:
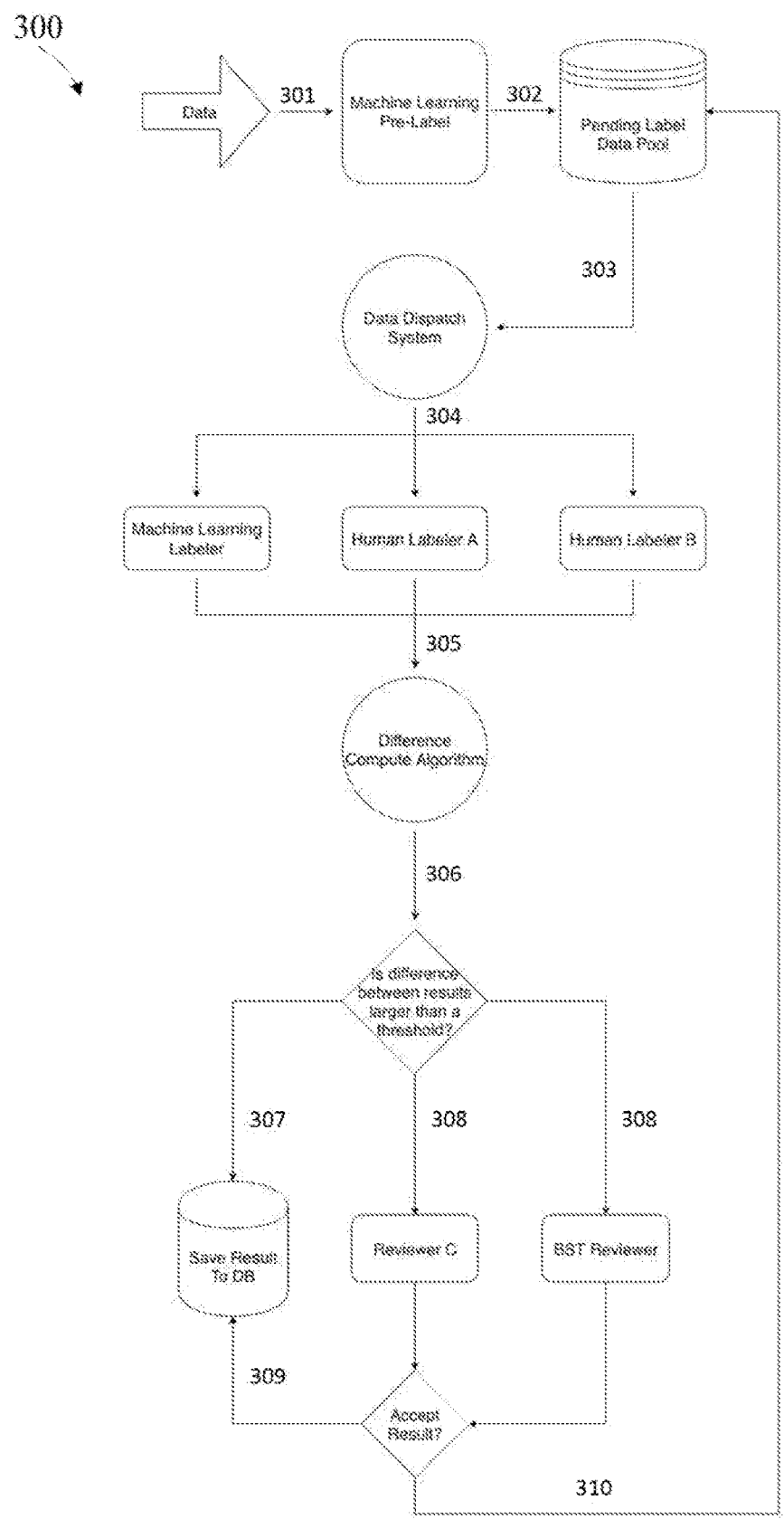
FIG. 3 is an example flow of mixed intelligence data labeling in accordance with one embodiment of the disclosure.

FIG. 3 depicts an example set of building blocks of the system. Image labeling is depicted in this example, however, the system may be used with a variety of sources such as text, sound, signal data, physical data, biological data, financial data, weather data, transit data and the like.

As incoming training data is routed to a server, the system pre-labels 301 objects with a machine labeler. This step decreases a human labeler's work load due to high confidence objects being labeled by the machine labeler. The machine labeler may be implemented by CPU, GPU, FPGA, ASIC and the like.

After the incoming training data is pre-labeled it is sent 302 to a pending label image pool. The pending label image pool is an online storage of unlabeled images provided by customers and the pre-labeled data.

The pending data dispatch system 303 prioritizes images to be human labeled based on image label quality, customer provided quantity, the bidding price, registered human labor availability and the like. The data dispatch system may be implemented by CPU, GPU, FPGA, ASIC and the like.

The labeler group 304 comprises machine learning algorithms utilized by machine labelers and human labelers. An image may be dispatched into one or more groups by the image dispatch system. The machine learning algorithms utilized by the machine labelers may be deep neural networks pre-trained with public datasets and customized by the internal retraining. By feeding the training data into different groups, a machine labeler's performance may be evaluated. Human Labelers verify, correct and or remove labels generated by the machine labeler mentioned in step 301, and add their own label to generate a final result.

Difference computing module 305 compares labeling differences between images labeled by more than one group. The difference is generally computed by intersection of union (IOU) of the labels. In the image labeling domain, bounding box differences are more easily quantifiable than free space differences. The difference computing module may be implemented by CPU, GPU, FPGA and the like.

A determination is made by element 306, based on the result of difference module, the system routes data to step 307, 308 or 309. A determination module makes the determination of routing and may be implemented by CPU, GPU, FPGA, ASIC and the like.

If the result of difference module is less than a predetermined threshold K, the system saves 307 the result directly to the database. A small difference detected by the difference model indicates that there was little labeling difference found between the multiple labelers.

If the result of difference computing module is greater than a predetermined threshold K, system sends 308 the result through a human reviewer. A dedicated reviewer, marked as BST Reviewer in the chart, or a freelance reviewer, marked reviewer C determines whether the label is to be saved or to the object is to be re-labeled.

If the labeling results are acceptable, the labels are saved 309 for the customer to review and download, as well as to be used as training data for the machine labeler in the image dispatch system. The labels are merged into an acceptable label result pool and stored in the pending label data pool.

If the labeling results are unacceptable, the system gathers feedback and marks the image as a mis-labeled object and adds metadata comments 310. The next time the image dispatch system dispatches this image it will be dispatched based on previous feedback.

In one example, the dispatch system dispatches the image to an additional human labeler with more experience and avoids sending the image to the human labeler who invalidly labeled the image previously. This is an example of one of the differentiable properties of the system.

One example difference module algorithm may include the steps of matching a bonding box, for multiply labeled objects with a bonding box in one result. This entails finding the closest bonding box in the other labeled result.

The algorithm finds matching bonding boxes by determining the center of bonding boxes of both results, finding the closest center point in the other result and if two bonding boxes have similar areas, and the center point is within a specific distance, then it is determined that the two bonding boxes have centers that are proximate.

If however the closest center point is not proximate for the bonding boxes, it is determined that the bonding box doesn't match the bonding box in the other result.

The difference of the bounding boxes may be determined by an intersection of union (IOU) of the bounding boxes. If the two bounding boxes cover similar percentage areas the bonding boxes are determined to be similar.

Figure 4:
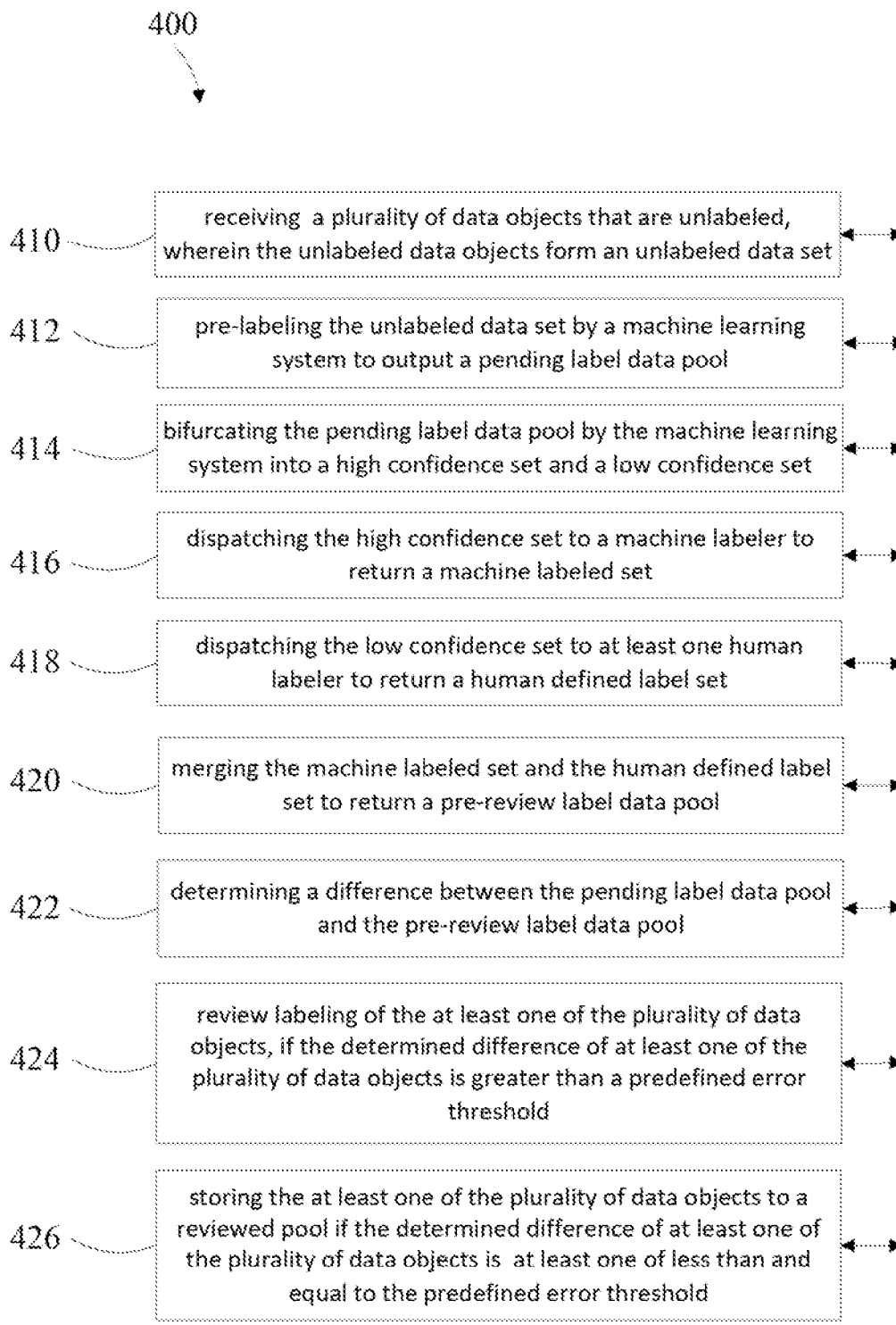
FIG. 4 is an example method of mixed intelligence data labeling in accordance with one embodiment of the disclosure.

One example the difference determination may be found by the following equation:

$$s = 100(2\Omega/(a+ß) - C\mu)$$

s: determined difference of the two results
Ω: number of bonding boxes that are marked as similar
a: number of bonding boxes in result A
ß: number of bonding boxes in result B
μ: number of bonding boxes that do not have a corresponding match in other result.
C: penalty constant FIG. 4 depicts an example method of hybrid data labeling for machine learning that includes receiving 410 a plurality of data objects that are unlabeled, wherein the unlabeled data objects form an unlabeled data set and pre-labeling 412 the unlabeled data set by a machine learning system to output a pending label data pool. The method also performs bifurcating 414 the pending label data pool by the machine learning system into a high confidence set and a low confidence set, dispatching 416 the high confidence set to a machine labeler to return a machine labeled set and dispatching 418 the low confidence set to at least one human labeler to return a human defined label set. The method also comprises merging 420 the machine labeled set and the human defined label set to return a pre-review label data pool, determining 422 a difference between the pending label data pool and the pre-review label data pool, review labeling 424 of the at least one of the plurality of data objects, if the determined difference of at least one of the plurality of data objects is greater than a predefined error threshold and storing 426 the at least one of the plurality of data objects to a reviewed pool if the determined difference of at least one of the plurality of data objects is at least one of less than and equal to the predefined error threshold.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of hybrid data labeling for machine learning, comprising:
   receiving a plurality of data objects that are unlabeled, wherein the unlabeled data objects form an unlabeled data set;
   pre-labeling the unlabeled data set by a machine learning system to output a pending label data pool;
   bifurcating the pending label data pool by the machine learning system into a high confidence set and a low confidence set;
   dispatching the high confidence set to a machine labeler to return a machine labeled set;
   dispatching the low confidence set to at least one human labeler to return a human defined label set;
   merging the machine labeled set and the human defined label set to return a pre-review label data pool;
   determining a difference between the pending label data pool and the pre-review label data pool;
   review labeling of the at least one of the plurality of data objects, if the determined difference of at least one of the plurality of data objects is greater than a predefined error threshold; and
   storing the at least one of the plurality of data objects to a reviewed pool if the determined difference of at least one of the plurality of data objects is at least one of less than and equal to the predefined error threshold.

2. The method of hybrid data labeling of claim 1, further comprising:
   merging the reviewed pool and the review labeled at least one of the plurality of data objects into an acceptable label result pool; and
   storing the acceptable label result pool to the pending label data pool.

3. The method of hybrid data labeling of claim 2, further comprising adding metadata comments to the review labeled at least one of the plurality of data objects.

4. The method of hybrid data labeling of claim 3, further comprising resetting a portion of the high confidence set to the low confidence set when the determined difference is greater than the predefined error threshold.

5. The method of hybrid data labeling of claim 4, further comprising providing feedback to the at least one human labeler when the determined difference is greater than the predefined error threshold.

6. The method of hybrid data labeling of claim 5, further comprising dispatching a mis-labeled object from the low confidence set by the at least one human labeler to another of the at least one human labeler.

7. The method of hybrid data labeling of claim 1, further comprising training the machine labeler based on the review labeling.

8. The method of hybrid data labeling of claim 1, wherein the dispatching of the low confidence set is based on at least one of pre-computed quality, customer provided quantity, bidding price and registered human labor availability.

9. The method of hybrid data labeling of claim 1, wherein the determining the difference is based on intersection of union of labels.

10. The method of hybrid data labeling of claim 1, wherein the determining the difference is based on matching bonding boxes.

11. The method of hybrid data labeling of claim 1, wherein the determining the difference is based on free space differences.

* * * * *